United States Patent [19]
Renner et al.

[11] Patent Number: 4,754,454
[45] Date of Patent: Jun. 28, 1988

[54] SYNCHRONIZATION CIRCUITRY FOR DUPLEX DIGITAL SPAN EQUIPMENT

[75] Inventors: Robert E. Renner, Glendale; Kevin W. Williams, Phoenix, both of Ariz.

[73] Assignee: GTE Communication Systems Corporation, Phoenix, Ariz.

[21] Appl. No.: 931,318

[22] Filed: Nov. 17, 1986

[51] Int. Cl.⁴ ............................................. H04J 3/06
[52] U.S. Cl. ................................... 370/100; 375/106
[58] Field of Search .................. 375/38, 40, 106, 113, 375/114; 370/100, 58, 110.1; 371/42, 47

[56] References Cited

U.S. PATENT DOCUMENTS

| | | | |
|---|---|---|---|
| 4,234,956 | 11/1980 | Adderley et al. | 375/38 |
| 4,477,895 | 10/1984 | Casper et al. | 375/40 |
| 4,507,780 | 3/1985 | Perry | 370/100 |
| 4,531,210 | 7/1985 | Perry | 370/100 |
| 4,656,645 | 4/1987 | Kaneko | 375/40 |
| 4,680,776 | 7/1987 | Ikeuchi et al. | 375/40 |

Primary Examiner—Michael A. Masinick
Assistant Examiner—Stephen Chin
Attorney, Agent, or Firm—Frank J. Bogacz

[57] ABSTRACT

This circuit facilitates the synchronization of two copies of digital control units. These digital control units control a number of digital spans. One copy of this circuit is active at any one particular time. This one copy drives all the remaining circuitry of the digital span interface for both copies of the digital control unit. The other copy of this circuit is typically in the ready-standby mode. It is not actively driving the remainder of the circuitry within its own copy. When one copy of the digital control unit is brought on-line, a framing operation must be performed to determine the proper framing bit for both copies. Circuitry in the cross-copy data path monitors an attempt to synchronize the two digital control unit copies. The data which is sent cross-copy is modified so that all data bits are at logic 1, except for a bit which the active copy believes is the proper S-bit or framing bit. In this manner, the standby copy cannot reframe on any bit, except the one which the active copy believes is the proper framing and synchronization bit.

20 Claims, 3 Drawing Sheets

SYNCHRONIZATION CIRCUITRY FOR DUPLEX DIGITAL SPAN EQUIPMENT

BACKGROUND OF THE INVENTION

The present invention pertains to digital transmission systems and more particularly to synchronizing multiple copies of time multiplexed digital span equipment.

Modern telecommunication systems transmit large amounts of data rapidly between systems. Digital spans are utilized to connect these systems and to transmit this data. The switching system usually contains a number of digital spans, each span transmitting data at a high rate between switching systems.

For public policy reasons, these switching systems must be highly reliable. In order to achieve this reliability, these systems are often implemented with redundant equipment. This redundancy scheme is a way of providing for fault tolerance of the system. That is, if one portion of the system fails there is a second portion of the system performing exactly the same process. The system functions properly, but in a simplex mode.

The redundant equipment is typically operated in a synchronous fashion. This prevents total system down time as a result of switch-over from one copy of the equipment to the other. It also provides a means of fault detection if the two copies differ.

U.S. Pat. Nos. 4,531,210 and 4,507,780 deal with duplex digital span controllers for one such system. This system is the GTD-5 EAX manufactured by GTE Communication Systems Corporation, the assignee of the present application. These patents teach duplex digital control units which operate synchronously. However, these digital control units serve a number of digital spans and therefore require a multiplexing operation.

These digital control units typically operate as active and ready standby copies. When one copy is out of service for some reason, it must be resynchronized with the active copy. Reasons for a copy being out of service may include regularly scheduled maintenance, troubleshooting or repair operations.

Accordingly, it is an object of the present invention to provide a circuit for accurately and rapidly resynchronizing multiple copies of digital span control equipment.

SUMMARY OF THE INVENTION

A number of digital spans connect one telecommunication system to other telecommunication systems. A telecommunication system includes a duplex pair of synchronously operated digital control units. Each of the digital control units operates to transfer data between several digital spans and the switching network of the telecommunication system. The duplex pair of digital control units includes one digital control unit which is operated in an on-line and active state, while the other digital control unit is operated in the off-line state. Each digital control unit has synchronization circuitry.

The synchronization circuit of each digital control unit has a clock which is operated to provide periodic time slot signals. A pulse generator is connected to each of the digital spans. The pulse generator operates in response to an indication that the other copy of the digital control unit is in the slave or non-active mode. The pulse generator produces a data bit stream with each data bit being of a first predefined logic value. The pulse generator also operates in response to an S-bit valid signal to produce a data bit signal in the data bit stream of a second predefined logic value.

Each synchronization circuit also includes a copy connection arrangement. This arrangement is connected to the clock, to the digital spans, to its own corresponding digital control unit, to the pulse generator and to the other digital control unit. The copy connection arrangement operates in response to the data bit stream to transfer the data bit stream to the other digital control unit.

Lastly, the other digital control unit is operated in response to the data bit stream and the data bit signal to make a transition from off-line to on-line and standby. Further, the other digital control unit synchronizes its operation with the on-line and active digital control unit.

A BRIEF DESCRIPTION OF THE DRAWINGS

DESCRIPTION OF THE PREFERRED EMBODIMENT

Figure 1:
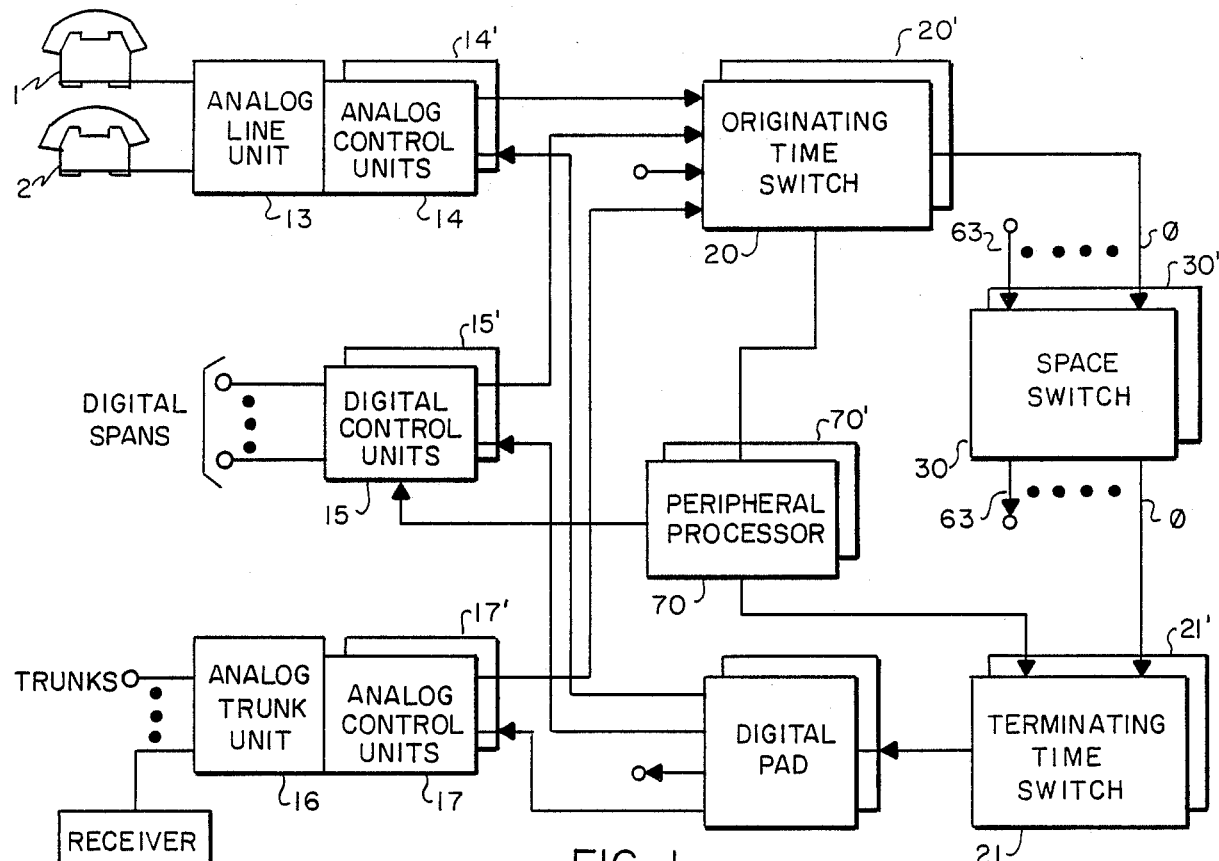
FIG. 1 is a block diagram of a switching system featuring the interconnection of digital spans to the switching system through digital control units.

Referring to FIG. 1, a time-space-time digital switching network along with the corresponding common control is shown. Telephone subscribers, such as subscribers 1 and 2, are shown connected to analog line unit 13. Analog line unit 13 is connected to both copies of the analog control unit 14 and 14'. Originating time switches 20 and 20' are connected to duplex pair of space switch units 30 and 30' which are in turned connected to the terminating time switch 21 and 21'. Time switch and control units 21 and 21' are connected to analog control unit 14 and 14' and ultimately to the telephone subscribers 1 and 2 via analog line circuit 13.

Digital control units 15 and 15' connect the digital spans to the switching network. Digital span equipment may be implemented using commonly available T1 digital span equipment such as a model 9004 manufactured by Siemens Transmission Systems Inc. Similarly, analog trunk unit 16 connects trunk circuits to the digital switching network via analog control units 17 and 17'.

A peripheral processor CPU 70 controls the digital switching network and digital and analog control units. Analog line unit 13 and a duplex pair of analog control units 14 and 14' interface to telephone subscribers directly. A duplicate pair of digital control units 15 and 15' control the incoming PCM data from the digital spans. Similarly, the analog trunk unit 16 and a duplex pair of analog control units 17 and 17' interface to trunk circuits. The analog and digital control units are each duplicated for reliability purposes.

Figure 2:
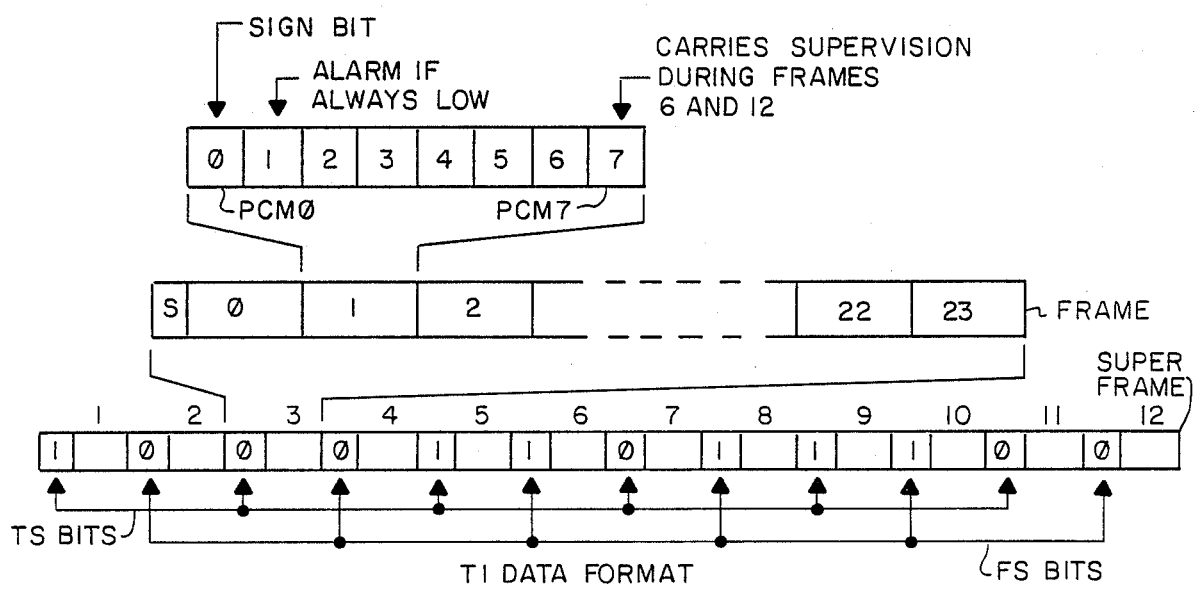
FIG. 2 is a bit and frame format of T1 transmission for the digital spans shown in FIG. 1.

The nature of a T1 data and its format is shown in FIG. 2. Each voice sample consists of eight bits, PCM0–PCM7. PCM0 is a sign bit. PCM1–PCM7 give the magnitude of the voice sample. PCM1 may also be used to convey alarm indications. PCM7 is used to carry supervision information during frames 6 and 12.

Twenty-four voice samples are organized together with an S bit to form a frame. Each voice sample in the frame is associated with one channel of voice (or data). The channels are numbered 0-23. The S bit carries a periodic pattern which, when detected, is used to identify the beginning of each frame of data. Twelve frames of data are organized to form a "super frame". During frames 6 and 12 of the super frame, PCM7 is used to carry supervision information associated with each of the 24 channels. The periodic pattern of data carried by the S bit also makes it possible to identify the individual frames within a super frame.

The pattern carried on the S bit is as follows (the first bit is associated with frame 0): "100011011100". It can be seen that during the odd numbered frames, the S bit forms an alternating pattern of "1"s and "0"s, i.e., "101010". This alternating pattern is referred to as the TS pattern and is used to identify the starting position of the frames. During the even numbered frames the S bit carries the pattern "001110", where the first "1" indicates the beginning of frame 6. This pattern is referred to as the FS pattern and is used to identify the position within a super frame.

Every time a TS bit occurs, a frame detector compares it with the value that it expects to see (ones during frames 1, 5, and 9; zeroes during frames 3, 7, and 11). If the TS bit disagrees with the expected value, it is considered an error. If two errors occur during any five consecutive examinations of TS bits for a digital span (T-carrier), then that digital span is considered to be out of frame. An alarm condition is operated. Eventually, an attempt will be made to reframe that T-carrier.

Examination of FS bits is an analogous procedure to that of the TS bits.

When reframing is attempted for a digital span, the frame detector examines each bit position for a period of 16 frames. If any bit position has consistently toggled during alternate frames, then that bit position is assumed to be the correct framing bit position, and the contents of a write vector will be updated to reflect the new S bit position.

If the TS pattern is properly aligned, but the FS pattern is in error, the frame detector will increment a write vector by four frame positions. This will occur every time the FS pattern is in error until eventually the write vector is properly aligned with the incoming FS pattern.

Figure 3:
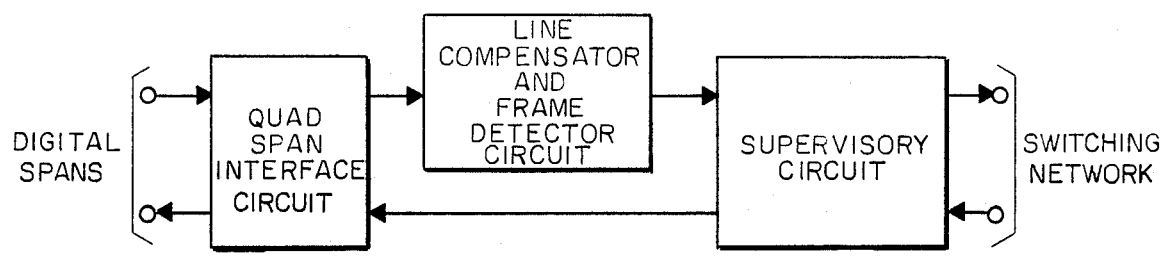
FIG. 3 is a block diagram of a portion of the digital control unit for transferring data between the digital spans and the switching network.

FIG. 3 depicts a portion of the digital control unit. FIG. 3 is a block diagram depicting one digital control unit of the duplex pair 15 and 15', as shown in FIG. 1. The digital control unit is connected between a number of digital spans and the switching network. In FIG. 3, the connection to only one digital span is shown.

The QSIC (Quad Span Interface Circuit) connects up to 4 digital spans to the switching network. Data input from a digital span is transmitted through the QSIC to the LCFD (Line Compensator and Frame Detector Circuit). Next, input data is transferred from the LCFD to the SUPY (Supervisory) circuitry. The data is then transferred from the SUPY circuit to the switching network.

Data output to the digital span is transferred from the switching network through the SUPY circuit, through the QSIC and to the digital span.

Figure 4:
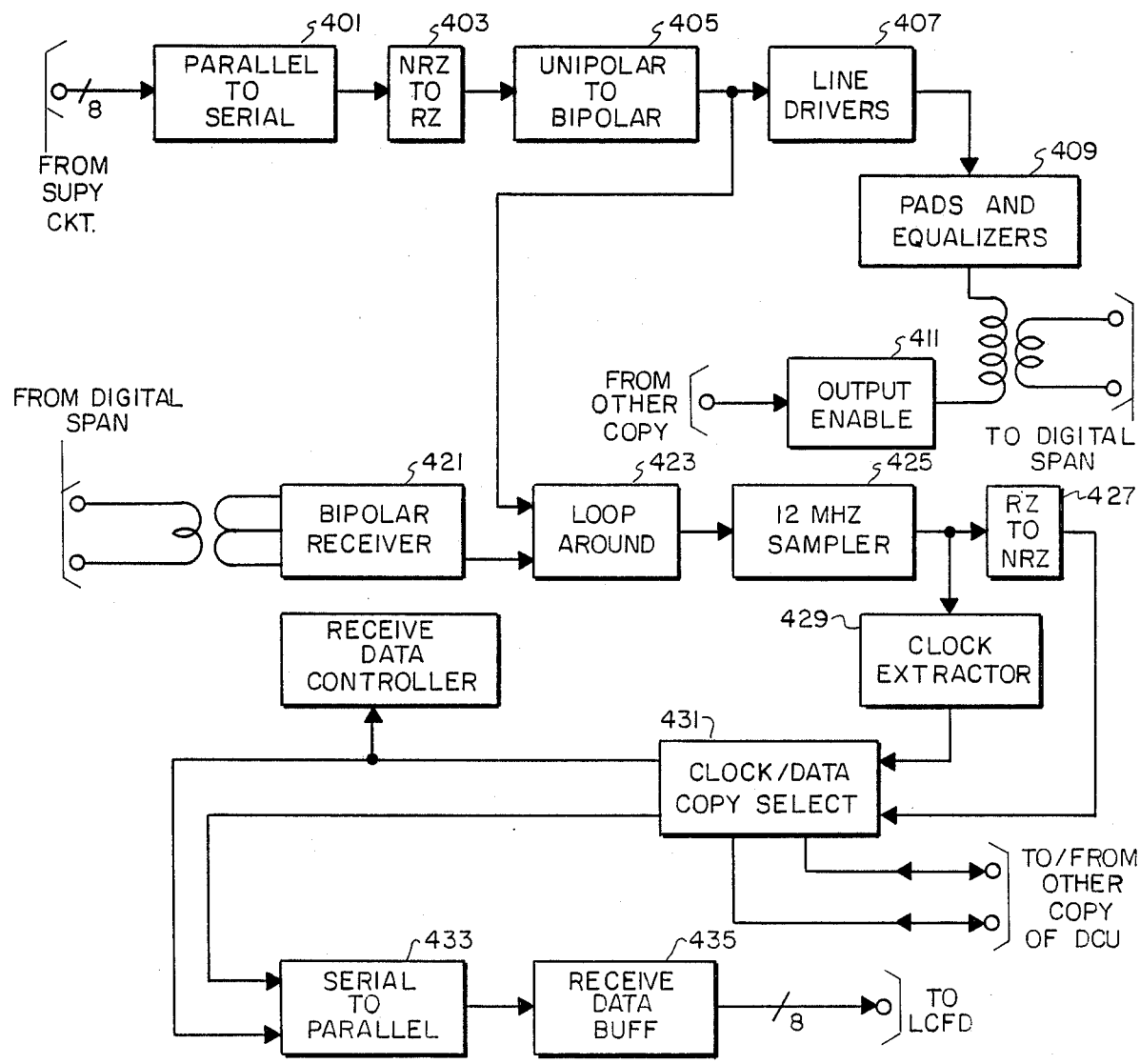
FIG. 4 is a block diagram of the Quad Span Interface Circuit portion of the digital control.

FIG. 4 is a block diagram of the receive and transmit sections of the QSIC. In the transmit section, data is transferred from the SUPY circuit to the QSIC. Block 401 of the QSIC converts parallel data to serial data. Block 401 takes a byte (8-bits) of parallel data and converts this parallel data to a serial data stream. Data is then transferred to converter 403 which converts non-return to zero (NRZ) data to data in a return to zero (RZ) format. This operation consists of logically "ANDING" the data with the transmit clock. The output consists of logic "1" bits that are 324 nanosecond pulses.

Converter 405 processes the RZ unipolar data and converts it into two bipolar parallel bit streams. One of these bit streams indicates particular data bits to be transmitted as positive pulses. The other bit stream indicates those bits which will be transmitted as negative pulses.

The line drivers 407 are composed of OR gates. These OR gates drive the transformer windings. The pads and equalizers 409 are optionally strapped into the circuit, depending on the length of the line from the QSIC to the DS1 cross-connect circuit. The output enable circuit 411 determines whether to drive the digital span transformer with the data from this copy of the digital control unit or the other copy. Normally, the transmitter outputs of the two QSIC copies are connected in parallel, but only one of the transmitters is enabled to drive the line via the transformer. The standby transmitter is disabled and placed into a high impedance state while the active transformer drives the line.

For data received by the switching system, the digital span transmits the data via the transformer to the bipolar receiver 421, which receives DS1 signal format data and converts it to unipolar data. The data at this point is TTL compatible. However, the output data of converter 421 is in the return to zero format.

The loop around circuit 423 selects the source of input signal to be transmitted to the 12 megahertz sampler 425. Normally, the output of the bipolar receiver 421 is transmitted to 12 megahertz sampler 425. In the maintenance mode, certain predetermined signaling patterns may be transmitted from the transmitter section and looped back to the receiver input via the connection to unipolar to bipolar converter 405. The 12 megahertz sampler 425 clocks the data received from the loop around circuit 423 at a 12.352 megahertz rate employing the network clock signal.

RZ to NRZ converter 427 is connected to the 12 megahertz sampler 425. Converter 427 stretches the 324 nanosecond pulses received from the sampler 425 to 648 nanoseconds. The clock extractor 429 is also connected to the sampler 425. The clock extractor employs a digital phase lock loop to extract a 1.544 megahertz clock signal from the output of sampler 425. The clock signal derived by clock extractor 429 is in phase with the received data signal from sampler 425. This means that the rising edges of the clock signal will normally occur during the middle of each data bit output by RZ to NRZ converter 427.

Next, the input data is transmitted through the clock/data copy select circuit 431. This circuit selects one of the QSIC copies to drive both copies of switching network. One copy of the QSIC is operated to drive both network copies in an active on-line mode, while the other copy of the QSIC is in a ready standby mode, synchronously operating with the active QSIC. Circuit 431 also operates to maintain synchronization between the two digital control unit copies when the standby copy makes a transition from off-line to on-line.

Circuit 433 converts serial data to parallel data. Circuit 433 takes the output of converter 427 and clocks it into a shift register using the derived clock signal from the clock extractor 429. When 8-bits of serial data have been collected by the serial to parallel circuit 433, they are transferred to the receive data buffer 435, where these 8-bits are latched. The LCFD then reads the data out of buffer 435 at the appropriate time.

Figure 5:
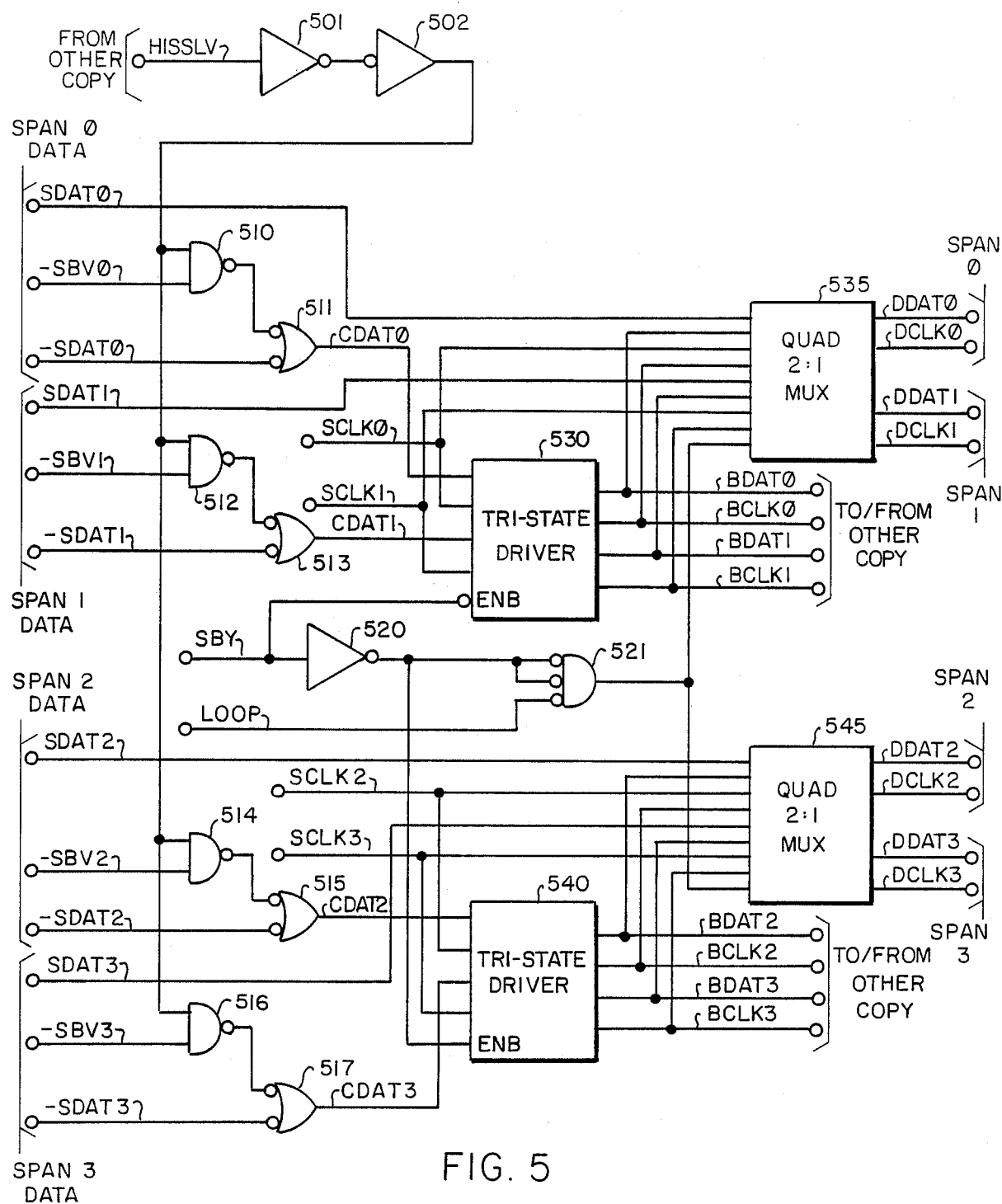
FIG. 5 is a schematic diagram embodying the principles of operation of the present invention.

FIG. 5 depicts a portion of this circuitry of the clock/data copy select circuit 431 shown in FIG. 4. FIG. 5 depicts one copy of the clock/data copy select circuit. Each copy of the digital control unit contains one such copy select circuit.

Each copy is connected to the other copy via a lead which indicates that the other copy is operating in a slave mode. The slave mode indicates that this copy is attempting to synchronize to the active copy. This slave mode indication is represented by the HISSLV signal which is transmitted on the corresponding lead to inverter 501. Inverter 501 is connected to inverter 502. Inverter 502 is connected to NAND gates 510, 512, 514 and 516 for distributing the HISSLV signal. Inverter 501 and 502 provide drive capability for the HISSLV signal.

Four digital spans (span 0 through span 3) are shown connected to the circuit. Other circuitry not shown produces a data signal and also an inverted version of the data signal. Span 0, for example, has data transmitted on the SDAT0 lead and the inverted signal transmitted on the −SDAT0 lead which is connected to NOR gate 511. NAND gate 510 is connected to NOR gate 511. NOR gate 511 produces the CDAT0 signal which is the cross-copy data signal which is transmitted to the other copy, if this copy of the circuit is the active copy (operating both DCU copies). The clock signal SCLK0 for span 0 is transmitted along with the data signal, if this copy of the circuit is the active copy. An S-bit valid signal (−SBV0) is transmitted to NAND gate 510.

Spans 1 through 3 are similarly arranged. For digital span 1, the SDAT1 signal is transmitted directly to Quad 2 to 1 MUX 535. The −SDAT1 signal is transmitted via the corresponding lead to NOR gate 513. Other circuitry generates an indication of whether it believes that the S-bit presently obtained is valid for this particular digital span. This S-bit valid indication is transmitted via the −SBV1 lead which is connected to NOR gate 512. The output of NOR gate 513 is the CDAT1 signal which is transmitted to tri-state driver 530 via the corresponding lead. For digital span 1, the clock signal is transmitted directly to driver 530 and MUX 535 via the SCLK1 lead.

For span 2 the S-bit valid signal is transmitted via the −SBV2 lead to NAND gate 514. Inverter 502 is connected to the other input of NAND gate 514. The output of NAND gate 514 is connected to an input of NOR gate 515. The inverted data signal −SDAT2 is connected to the other input of NOR gate 515. The non-inverted copy of the data signal for digital span 2 is connected directly to MUX 545. The output of NOR gate 515 is connected via the CDAT2 lead to tri-state driver 540.

Lastly, for digital span 3, the non-inverted data signal SDAT3 is connected directly to 2 to 1 MUX 545. The inverted data signal is transmitted to NOR gate 517 via the corresponding −SDAT3 lead. Inverter 502 is connected to one input of NAND gate 516. The other input of NAND gate 516 is the S-bit valid indicator signal for digital span 3 (−SBV3). NAND gate 516 is connected to the other input of NOR gate 517. The output of NOR gate 517 is the CDAT3 signal transmitted to tri-state driver 540 via the corresponding lead.

The standby signal SBY is transmitted via the corresponding lead to tri-state driver 530 and to inverter 520. Inverter 520 transmits the standby signal to tri-state driver 540 via a corresponding connection. Inverter 520 is also connected to NOR gate 521 for transmitting the SBY signal. In addition, a LOOP signal is transmitted to NOR gate 521 via a corresponding lead.

The first two outputs of MUX 535 are the DDAT0 and DCLK0 leads. These leads respectively contain the data and clock signals for digital span 0. These signals are ultimately transmitted to the LCFD circuit. Similarly, the DDAT1 and DCLK1 outputs of MUX 535 are data and clock signals for digital span 1.

The first two outputs of MUX 545 are the DDAT2 and DCLK2 signals. These signals are the data and clock signals for digital span 2. Similarly, the DDAT3 and DCLK3 outputs of MUX 545 are the data and clock signals for digital span number 3.

The clock signals for digital spans 0 and 1 (SCLK0 and SCLK1) are transmitted to tri-state driver 530 via corresponding leads. Similarly, the clock signals SCLK2 and SCLK3 are transmitted via corresponding leads to tri-state driver 540. Each of the positive going data signals and clock signals for spans 0 and 1 are transmitted to MUX 535. Each of the outputs of tri-state driver 530 are connected to the inputs of MUX 535. These outputs include the clock signals for span 0 and 1 and the cross-copy data signals (CDAT0 and CDAT1) for spans 0 and 1. In addition, each of the outputs of tri-state driver 530 is connected to the other copy of this circuit via the BDAT0 and BCLK0 leads (data and clock signals for span 0) and BDAT1 and BCLK1 leads (data and clock signals for span 1).

Each of the positive going data signals and clock signals for digital spans 2 and 3 are connected directly to MUX 545 via corresponding leads. The clock signals for digital spans 2 and 3 (SCLK2 and SCLK3) are transmitted to tri-state driver 540. In addition, the cross-copy data signals CDAT2 and CDAT3 are transmitted to tri-state driver 540 via corresponding leads. Each of the outputs of tri-state driver 540 is connected to an input of MUX 545. In addition, the outputs of tri-state driver 540 are connected to the other copy. Leads BDAT2 and BCLK2 transmit the data and clock signals for digital span 2. Leads BDAT3 and BCLK3 transmit the data and clock signals for digital span 3.

NOR gate 521 has its output connected to the select inputs of MUXs 535 and 545. This lead will select a particular data signal and an associated clock signal to be transmitted for each digital span.

As previously mentioned, one of the copies of this circuit is the active copy and the other copy is the ready-standby copy. If the copy of this circuit shown in FIG. 5 is the active copy, then the standby signal SBY will be at logic 0. As a result, tri-state drivers 530 and 540 will be enabled and this copy of the circuit will drive both copies of the down stream LCFD circuitry. If this is the standby copy of the circuit, then tri-state drivers 530 and 540 are disabled and the signals from the other copy are passed through multiplexers 535 and 545 to drive each of the down stream LCFDs.

For the remainder of this discussion, it shall be assumed that this copy of the circuit is the active copy. The standby copy of the circuit may be in the off-line mode due to system testing or initial circuit start-up. When it is desired that the standby copy become a ready-standby copy, it must be synchronized to the active copy. The HIS slave signal (HISSLV) is produced when the standby unit is being synchronized with the active unit. This signal is given extra drive capability by inverter drivers 501 and 502. Each copy of this circuit produces an indication of whether it believes the synchronization (S-bit) which it currently has is valid. This S-bit valid indication is produced on the −SBV0 lead for digital span 0, for example. Digital span 0 shall be used as an example. Each of the other spans operate similarly with their respective components as indicated.

When the other copy of the circuit is attempting synchronization, HISSLV is equal to logic 1 and the S-bit this circuit currently has is believed valid, −SBV0 is equal to logic 0 NAND gate 510 produces a logic 0 output. Since this input to gate 511 is again inverted, a logic 1 is input to gate 511. As result, the data output is a constant stream of logic 1.

The output of gate 511 is the cross-copy data signal CDAT0. Since this copy of the circuit is the active copy, tri-state driver 530 is enabled and the CDATO signal is transmitted to the other copy. This will result in the other copy receiving a steady stream of logic 1 bits for each bit position in the data stream. This will continue until the S-bit position is reached. Then the −SBV0 signal will go to logic 0. Therefore, the other copy of the circuit will see the S-bit valid position indicate a valid S-bit. That particular S-bit position will be the only bit in the data stream capable of being a logic 0.

Since the other copy of this circuit has now found the same S-bit position as this copy, synchronization of the two circuits will be achieved and the other copy of the circuit will be brought to the ready-standby state. Each of the gating arrangements shown for spans 1 through 3 operate in a similar fashion for their respective digital spans.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A plurality of digital spans connect one telecommunication system to other systems, said one telecommunication system including a duplex pair of sychronously operated digital control units, each said digital control unit being operated to transfer data between said plurality of digital spans and a switching network of said one telecommunication system, one said digital control unit being on-line and active and said other digital control unit being off-line, each said digital control unit including synchronization circuitry comprising:
   clock means being operated to provide periodic time slot signals;
   said other digital control unit providing a slave copy signal indicating that said other digital control unit is attempting to synchronize to said one digital control unit;
   pulse generating means connected to each of said digital spans, said pulse generation means being operated in response to said slave copy signal of said other digital control unit to produce a data bit stream signal of consecutive logic values, each data bit of said bit stream being of a first logic value;
   said pulse generation means being further operated in response to an S-bit valid signal to produce a data bit signal in said bit stream of a second logic value;
   copy connection means connected to said clock means, to said digital spans, to said one digital control unit, to said pulse generating means and to said other digital control unit, said copy connection means being operated in response to said data bit stream to transfer said data bit stream to said other digital control unit; and
   said other digital control unit being operated in response to said data bit stream and to said data bit signal to become on-line and standby and to synchronize its operation with said on-line and active digital control unit.

2. Synchronization circuitry as claimed in claim 1, said pulse generating means including a plurality of pulse generator circuit means, each pulse generator circuit means being connected between one corresponding digital span and said copy connection means.

3. Synchronization circuitry as claimed in claim 2, wherein there is further included drive means connected between each of the said plurality of pulse generator circuit means and said other digital control unit, said drive means being operated to receive and to distribute a slave mode signal from said other digital control unit.

4. Synchronization circuitry as claimed in claim 3, said drive means including:
   first inverter means connected to said other digital control unit; and
   second inverter means connected between said first inverter means and said plurality of pulse generator circuit means.

5. Synchronization circuitry as claimed in claim 4, each pulse generator circuit means including:
   first gating means connected to said corresponding digital span and to said second inverter means; and
   second gating means connected to said corresponding digital span and to said first gating means, said second gating means being operated to produce a cross-copy data signal.

6. Synchronization circuitry as claimed in claim 5, said first gating means including NAND gating means.

7. Synchronization circuitry as claimed in claim 5, said second gating means including NOR gating means.

8. Synchronization circuitry as claimed in claim 5, said copy connection means including:
   switching means connected to said second gating means; and
   multiplexing means connected between said switching means and said one digital control unit.

9. Synchronization circuitry as claimed in claim 8, said switching means being further connected to said clock means for receiving said periodic time slot signals corresponding to each of said cross-copy data signals.

10. Synchronization circuitry as claimed in claim 9, said switching means being further connected to switching means of said other digital control unit.

11. Synchronization circuitry as claimed in claim 10, said switching means including a plurality of switching circuits.

12. Synchronization circuitry as claimed in claim 11, each of said plurality of switching circuits including a tri-state driver device.

13. Synchronization circuitry as claimed in claim 11, wherein there is further included selection means connected between said plurality of switching circuits and said corresponding digital control unit.

14. Synchronization circuitry as claimed in claim 13, said selection means including third inverter means connected to each of said plurality of switching circuits, said third inverter means being operated in response to a standby signal of said corresponding digital control unit to enable or to disable each of said switching circuits.

15. Synchronization circuitry as claimed in claim 14, said multiplexing means being further connected to said corresponding digital control unit and to multiplexing means of said other digital control unit.

16. Synchronization circuitry as claimed in claim 15, said multiplexing means including a plurality of multiplexing circuits.

17. Synchronization circuitry as claimed in claim 15, said multiplexing means being further connected to said clock means for receiving said periodic time slot signals and connected to said digital spans for receiving said data transfer between said digital span and said switching network.

18. Synchronization circuitry as claimed in claim 16, each of said multiplexing circuits including Quad-Input 2 to 1 multiplexer devices.

19. Synchronization circuitry as claimed in claim 16, wherein there is further included third gating means connected to said third inverter means and to each of said multiplexing circuits, said third gating means being operated to enable said multiplexing circuits to select a data signal and a clock signal, from said one or said other digital control unit, for each of said digital spans.

20. Synchronization circuitry as claimed in claim 19, said third gating means including NOR gating means.

* * * * *